United States Patent [19]
Wehrli

[11] 3,767,344
[45] Oct. 23, 1973

[54] APPARATUS FOR REPROCESSING PLASTIC SCRAP MATERIAL

[75] Inventor: Zeno Wehrli, Hagglingen, Switzerland

[73] Assignee: Riwisa AG. Kunststoffwerke Hagglingen, Hagglingen, Switzerland

[22] Filed: Aug. 25, 1971

[21] Appl. No.: 174,804

[30] Foreign Application Priority Data
Sept. 15, 1970 Switzerland....................... 13688/70

[52] U.S. Cl................................... 425/308, 83/906
[51] Int. Cl.............................................. B29f 3/00
[58] Field of Search........................... 425/307, 308; 83/906, 355, 356.2

[56] References Cited
UNITED STATES PATENTS

| | | | |
|---|---|---|---|
| 3,250,834 | 5/1966 | Collins | 425/308 X |
| 3,545,689 | 12/1970 | Luscombe | 83/32 X |
| 3,522,342 | 7/1970 | Nungesser et al. | 425/308 X |
| 3,577,494 | 5/1971 | Chisholm et al. | 425/307 X |
| 3,459,625 | 8/1969 | Heller et al. | 425/307 X |
| 3,334,533 | 8/1967 | Davis | 83/355 X |
| 3,166,966 | 1/1965 | Ruschmann | 83/355 X |
| 3,228,274 | 1/1966 | Cagen | 83/355 X |

*Primary Examiner*—J. Spencer Overholser
*Assistant Examiner*—Michael O. Sutton
*Attorney*—Robert D. Flynn et al.

[57] ABSTRACT

A method and apparatus for reprocessing plastic scrap material wherein scrap material is extruded into a sheet by means of a worm-type extruder, the extruded sheet being cooled by a liquid-free cooling system which includes a number of cooling rollers over which the hot extruded material is passed to be cooled. Preferably, the hot extruded material contacts a substantial portion of the peripheral surface of a number of the cooling rollers to improve cooling efficiency. After cooling, the extruded sheet is granulated, preferably by a pair of relatively movable knives.

12 Claims, 4 Drawing Figures

PATENTED OCT 23 1973 3,767,344

APPARATUS FOR REPROCESSING PLASTIC SCRAP MATERIAL

The present invention relates to a method and apparatus for recycling (i.e. reprocessing or regenerating) plastic scrap, and more particularly to granulating waste sheets of plastic materials.

There are various well known methods for recycling or regenerating plastic scrap. In a first known method, the scrap material, waste sheets for example, is fed into a container in whose bottom portion a crushing unit, consisting for example of a rotating chopping arm or impeller, is installed. By means of this arm or impeller, the plastic scrap is chopped up and by the resultant generated heat the scrap is brought to the plasticity threshold and is formed into particles. The resulting granulate or agglomerate must be freed of water with an extensive system of pipes and then be drawn off. Such an installation is relatively large, and correspondingly complicated and uneconomical.

In another known method for recycling or regenerating plastic scrap, the resultant waste material, for example polyethylene, is by means of a tamping or feeder device drawn into a worm-type extruder, and then extruded under high pressure out of a perforated nozzle. The perforated nozzle has a large number of boreholes, for example 50, 100, or 500 boreholes, so that correspondingly many small extrusions are obtained which are immediately sheared off at the nozzle by a rotating knife. To prevent the sheared off material from adhering together, a water-bath is used in which the nozzle has its mouth and in which also the rotating knife moves. Thereby the granulate coming out of the nozzle and sheared off by the knife is superficially cooled by the water, the water is extracted through an extensive pipe system and the granulate is drawn off. This system is likewise extensive and correspondingly complicated and uneconomical.

The known systems must, because of their complexity of apparatus, be set up for a high capacity, being otherwise uneconomical. This is, however a disadvantage from the standpoint of general production techniques. In practice, for example in a plastic sheet factory, plastic sheets of various kinds are encountered. If for example only polyethylene is being processed, however in four, five, or more colors, it would be preferable that the different color scrap sheets could be separately reprocessed in such a way that a granulate results of the same color and other characteristics as the original material used. This however implies that this granulate is first absolutely clean and relative to color mixture precisely corresponding to the regenerating material, thus containing no foreign colors. With known systems whose economic viability is only justified if they can be set up for a high recycling capacity, it is not possible to process the plastic scrap by separating it as to type and lot, for this would require utilization of the equipment at relatively low capacities and would require a complete cleaning of the equipment after each change of lot. On the other hand, the complexity and high cost of the known systems does not permit the utilization of several such recycling systems per production sector in the factory. The result of this is that it is not possible to process the plastic scrap in such a way that the granulate would correspond to the original material, because separation according to type and lot is not economically possible. Also, in the known equipment, regeneration results with a relatively high temperature setting, which can cause thermal decomposition of the material.

It is an object of the present invention to provide a procedure for reprocessing of plastic scrap, which is economical to use at small capacities, which needs no complicated apparatus and in which reprocessing is effected at relatively low temperature settings as compared to the prior art, so that it is possible to install several different units side by side for the processing of different materials to thereby obtain a regenerated granulate that is equivalent to the original material.

SUMMARY OF THE INVENTION

The method of the present invention is characterized in that the plastic scrap material is subjected to an extrusion operation with approximate compression-freedom and at low temperature settings. The scrap material is extruded into a sheet which is cooled by means of a liquid-free cooling device and the sheet is then broken down into a granulate.

In accordance with the present invention, exit temperature of the plastic material at the end of the extrusion operation is preferably held to between 100° to 110°C.

The apparatus for carrying out the above method is characterized by a short double worm-type extruder for receiving the plastic scrap material, a fishtail die being located at the output end of the extruder. The extruded material from the fishtail die is then fed to several cooling rollers over which the sheet coming out of the die is sequentially drawn. The apparatus is further characterized by a granulator receiving the cooled sheet to granulate the cooled extruded sheet of plastic material.

DETAILED DESCRIPTION OF PREFERRED EMBODIMENT

Figure 1:
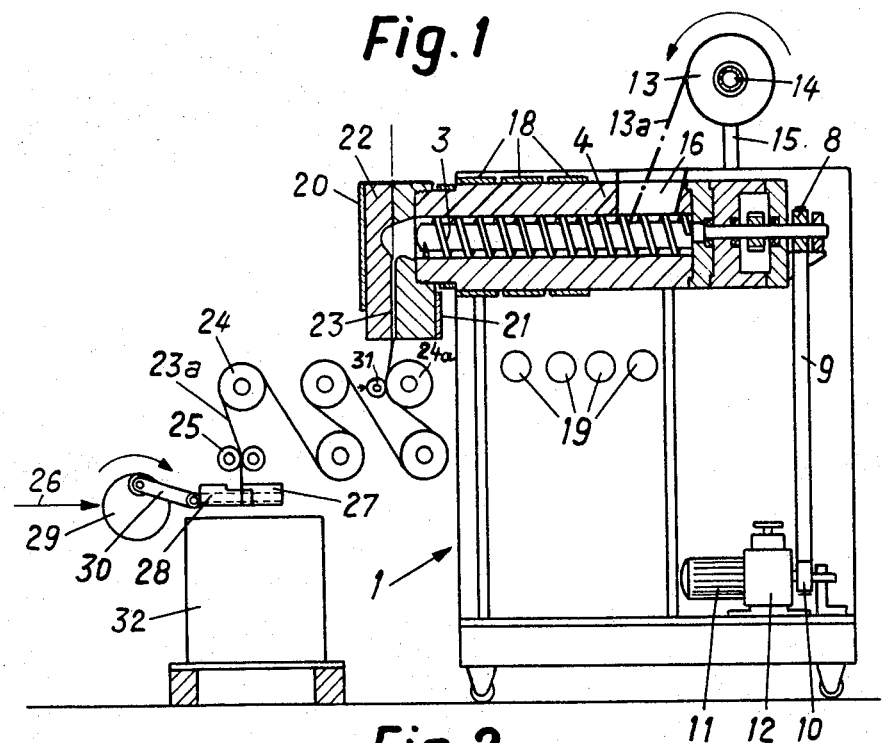
FIG. 1 is a schematic side-view, partially in section, of a plastic scrap regeneration device according to the present invention.
Figure 2:
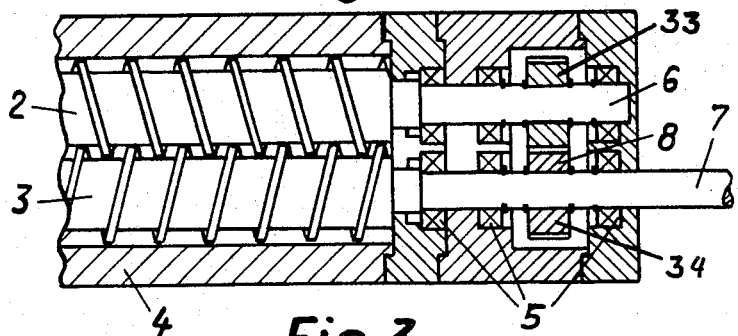
FIG. 2 is an enlarged horizontal section through the extruder of FIG. 1.
Figure 3:
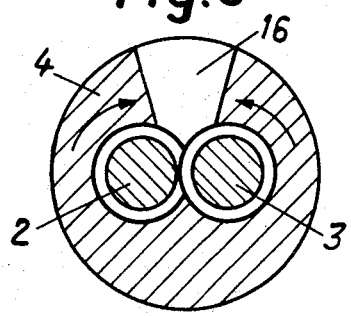
FIG. 3 is an enlarged vertical section through the extruder of FIG. 1 in the region of the feeder zone.

In FIG. 1 a double worm extruder 1 is characterized by extremely short worms or screws 3 (worm 2 is shown in FIGS. 2 and 3). The operational length of a screw 3 is only about 4 to 6 times the screw diameter. The same relationship holds for screw 2.

FIG. 2 illustrates the installation of extruder screws 2 and 3 in extruder housing 4. Each screw 2, 3 has a shaft end 6, 7, respectively. Shaft end 7 of screw 3 is longer than the shaft end 6 of screw 2 and carries a chain wheel 8 which together with a chain 9 and a chain pinion 10 forms a chain drive by means of which a motor 11, which is coupled to chain pinion 10, rotatably drives the screw 3. Between motor 11 and chain pinion 10 a variable speed drive mechanism 12 is installed, by means of which the worm speed of worm extruder 1 may be adjusted. Gears 33 and 34 are connected to shaft ends 6 and 7, respectively, by means of which the rotation of screw 3 is also transmitted to screw 2. The screws 2 and 3 are rotationally driven in opposite directions, as may be observed by the arrows in FIG. 3.

Waste material, such as plastic sheet material 13 for example, are rolled up on rolls 14 which, as FIG. 1 shows, are rotatably arranged on a base support 15 above worm extruder 1. Waste sheets 13a are led to screws 2 and 3 through a feeder opening 16, and are engaged by screws 2 and 3 and drawn into the extruder, wherein the material is extruded. A device 18 controls the temperature of the extruder.

At the exit of housing 4 a fishtail die 22 is arranged into which the plasticized (or semi-melted) material enters in order to be extruded through slit 23 as a sheet. Heating devices 20 and 21 coupled to the die 22 serve to assure the desired temperature. Following exit of the sheet out of the slit-like nozzle 23 of the die, the sheet is drawn over several cooling rollers. The first roller 24a operates together with a corrugated roller 31 and the sheet passes between rollers 24a and 31. Roller 31 may alternatively be rippled, grooved, serrated, knurled, furrowed, etc. Drive is provided as indicated by the arrow to roller 31 which is pressed against roller 24a. The material coming out of die 22 in the plastic state obtains a calibration and stamping by rollers 31 and 24a. The cooling roller arrangement is particularly effective in that the looping angle or angle of contact (or grip) of the sheet by the rollers is relatively large, so that the hot material becomes, after a relatively short distance traversed, effectively cooled. By virtue of the high contact area between the hot sheet and the cooling rollers, the sheet is quickly cooled to the extent that, after passage through a pair of compressing (or crushing) cylinders (or rolls) 25, the material is drawn into a cutting device generally designated at 26, in which the granulate is cut or punched off directly from the entering sheet.

Figure 4:
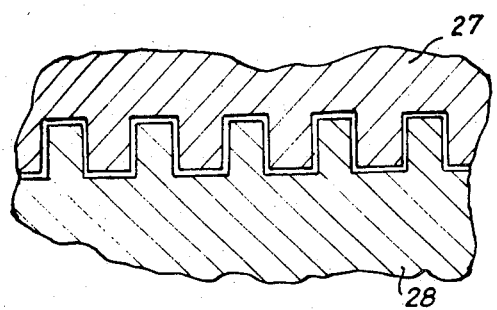
FIG. 4 is a vertical section through the shearing part of the device of FIG. 1.

As shown in FIG. 4, device 26 consists of two knives 27,28 moved relative to each other in the manner indicated. The knives 27,28 display a rectangular profile. As shown in FIG. 1, knife 28 is moved back and forth by a crank gear device 29,30, and continuously cuts small rectangular prisms from entering sheet 23a, which fall as a granulate into the container 32 installed underneath cutting device 26. To improve the cutting operation, the cutting edge of one knife is arranged obliquely to the cutting edge of the other knife, so that the cutting of the sheet is not simultaneous, but one rectangular portion after another.

With the equipment described above, a granulate can be produced which corresponds to the original material and which also exhibits the bulk weight (or density) of the granulate concerned. Because of the relatively simple individual parts, these devices can be econimically set up for operation at relatively low capacities as compared with the prior art so that each material can be economically reprocessed with a separate unit of equipment. There also arises the possibility of being able in practice to regenerate scrap as soon as it is produced and to put it straight back into production without substantial delay and with a minimum of handling. This avoids dirtying of the scrap material.

The relatively small handling capacity of such a device has an added advantage in that since the rate of material processing is relatively small, as a consequence the temperature setting can be kept so low that thermal disintegration (or degradation) of the material is virtually eliminated. Thus, the regenerated material corresponds precisely as to quality and other characteristics to the original new material bed to the extruder.

If, for example, 50 kg of polyethylene sheets of a certain color is produced in a given production, the waste generated by tearing at the edges or by initial adjustments can be immediately regenerated during the execution of the production operation and reintroduced into the production machine so that there is virtually no left-over waste when the production of the quota of said sheets has been completed. This can also be effected during a subsequent production run with different material merely by substituting a new scrap regeneration device of the present invention, which is small, simple and economical enough so that it is feasible to have several on hand for immediate use. Since the prior art units are larger and more complicated, such improved operational advantages cannot be obtained thereby.

Preferably, the two screws 2, 3 have equal pitch and are without any compression relation. This has the result that the scrap material is commonly melted at a minimum temperature and without any influence of frictional heat, which when uncontrolled always has a bad effect on the material being regenerated.

The above-described device does not require the use of water for cooling purposes, and does not require the plumbing of the prior art devices. When water cooling is used, as in the prior art, foreign bodies and dust can easily get into the material being reprocessed. This ill effect is not present in the device of the present invention.

It should be clear that various modifications and alterations of the illustrated embodiment can be made within the scope of the present invention as defined in the appended claims.

I claim:

1. Apparatus for reprocessing plastic scrap material comprising:
   a short double worm extruder (1) including means (16) for receiving and feeding plastic scrap material to the double worms, and a die (22) at the output of said extruder, said die (22) having a smooth aperture (23) and forming sheet-like extruded material (23a);
   a plurality of smooth cooling rollers receiving said extruded sheet-like material (23a) from said die (22) and over which, one after another, the extruded sheet-like material (23a) is passed for cooling; and
   granulating means (26) receiving said cooled extruded sheet-like material (23a) from said cooling rollers to granulate said material, said granulating means (26) including a pair of knives (27, 28) having substantially rectangular shaped cutting edges, said knives being movable relative to each other for granulating said cooled sheet-like material (23a).

2. Apparatus according to claim 1, wherein said extruder (1) includes a pair of worms (2,3) having equal pitch angles.

3. Apparatus according to claim 1, wherein said extruder (1) includes means (11, 12) for adjustably driving said extruder worms.

4. Apparatus according to claim 1, including a first roller (24a) mounted adjacent to said die (22) and a rotatably driven corrugated roller (32) against which said first roller (24a) is pressed, said sheet-like material (23a) passing between said first and corrugated rollers (24a and 32) prior to passing over said cooling rollers.

5. Apparatus according to claim 1, wherein the relative movement of the knives (27, 28) is horizontal and wherein the cooled extruded sheet-like material enters into the path of said knives in the vertical direction.

6. Apparatus according to claim 1, wherein said granulating means includes a pair of knives (27, 28) one of said knives having an oblique cutting edge engaging the cutting edge of the other of said knives.

7. Apparatus according to claim 1, including a pair of rollers (25) mounted on the entry side of said granulating means (26) through which said extruded sheet-like material (23a) is passed for guiding said sheet-like material (23a) to enter said granulating means in a vertical direction.

8. Apparatus according to claim 1, wherein said extruded material engages a substantial portion of the peripheral surfaces of a number of said cooling rollers.

9. Apparatus according to claim 8, wherein said extruded sheet-like material (23a) engages more than one-half of the peripheral surfaces of said number of cooling rollers.

10. Apparatus according to claim 1, wherein the ratio of the operational length to diameter of the extruder worms (2, 3) is from about 4:1 to 6:1.

11. Apparatus according to claim 1, including means (18) coupled to said extruder for maintaining said extruder at a low temperature.

12. Apparatus according to claim 11, wherein said temperature maintaining means (18) maintains the extruder temperature such that the material leaving said extruder has a temperature between about 100° to 110°C.

* * * * *